US012587265B2

(12) United States Patent
Wang et al.

(10) Patent No.: US 12,587,265 B2
(45) Date of Patent: Mar. 24, 2026

(54) BACKHAUL LINK FOR A HIGH ALTITUDE PLATFORM

(71) Applicant: Google LLC, Mountain View, CA (US)

(72) Inventors: Jibing Wang, San Jose, CA (US); Erik Stauffer, Mountain View, CA (US)

(73) Assignee: Google LLC, Mountain View, CA (US)

( * ) Notice: Subject to any disclaimer, the term of this patent is extended or adjusted under 35 U.S.C. 154(b) by 240 days.

(21) Appl. No.: 18/560,318

(22) PCT Filed: May 31, 2022

(86) PCT No.: PCT/US2022/031586
§ 371 (c)(1),
(2) Date: Nov. 10, 2023

(87) PCT Pub. No.: WO2022/256315
PCT Pub. Date: Dec. 8, 2022

(65) Prior Publication Data
US 2024/0243804 A1      Jul. 18, 2024

Related U.S. Application Data

(60) Provisional application No. 63/195,467, filed on Jun. 1, 2021.

(51) Int. Cl.
*H04W 76/10*          (2018.01)
*H04B 7/185*          (2006.01)
(Continued)

(52) U.S. Cl.
CPC ........ *H04B 7/18504* (2013.01); *H04W 72/04* (2013.01); *H04W 76/10* (2018.02);
(Continued)

(58) Field of Classification Search
CPC ..................................................... H04W 76/10
See application file for complete search history.

(56) References Cited

U.S. PATENT DOCUMENTS

| | | |
|---|---|---|
| 2018/0020361 A1 | 1/2018 | Teller |
| 2018/0083672 A1 | 3/2018 | Alexander et al. |

(Continued)

FOREIGN PATENT DOCUMENTS

| | | |
|---|---|---|
| EP | 2978258 A1 | 1/2016 |
| WO | 2020258294 A1 | 12/2020 |
| WO | 2022056315 A1 | 12/2022 |

OTHER PUBLICATIONS

PCT International Search Report and Written Opinion for corresponding patent application PCT/US2022/031586 mailed Sep. 8, 2022.

(Continued)

*Primary Examiner* — Young Lee
(74) *Attorney, Agent, or Firm* — Womble Bond Dickinson (US) LLP

(57) ABSTRACT

A backhaul node can implement a method for managing communications between a non-terrestrial base station and a core network. The method may include: establishing (502) a connection to the core network; requesting (504), from the non-terrestrial base station, radio resources for a radio connection between the backhaul node and the non-terrestrial base station; establishing (506) the radio connection; and routing (508) a data packet between the non-terrestrial base station and the core network using the radio connection.

20 Claims, 5 Drawing Sheets

(51) Int. Cl.

| | |
|---|---|
| *H04W 72/04* | (2023.01) |
| *H04W 74/0833* | (2024.01) |
| *H04W 74/0836* | (2024.01) |
| *H04W 74/0838* | (2024.01) |
| *H04W 84/06* | (2009.01) |
| *H04W 88/14* | (2009.01) |

(52) U.S. Cl.
CPC .... *H04W 74/0833* (2013.01); *H04W 74/0836* (2024.01); *H04W 74/0838* (2024.01); *H04W 84/06* (2013.01); *H04W 88/14* (2013.01)

(56) References Cited

U.S. PATENT DOCUMENTS

| | | |
|---|---|---|
| 2018/0092141 A1 | 3/2018 | Wei et al. |
| 2019/0182884 A1 | 6/2019 | Deenoo |
| 2020/0146076 A1 | 5/2020 | Islam et al. |
| 2020/0323012 A1 | 10/2020 | Kreiner |
| 2020/0396000 A1 | 12/2020 | Ryu |
| 2021/0014918 A1 | 1/2021 | Novlan |
| 2021/0084565 A1 | 3/2021 | Ananth |
| 2021/0105622 A1 | 4/2021 | Rajadurai |
| 2021/0144562 A1 | 5/2021 | Ananth et al. |
| 2021/0314060 A1 | 10/2021 | Shi et al. |

OTHER PUBLICATIONS

Zhang, Y., et al. "A Survey on Integrated Access and Backhaul Networks", https://www.frontiersin.org/articles/10.3389/frcmn.2021.647284/full, Jun. 1, 2021.

"Satellite Earth Stations and Systems (SES);Seamless integration of satellite and/or HAPS (High Altitude Platform Station) systems into 5G and related architecture options," ETSI TR103 611 V1.1.1 (Jun. 2020).

Office Action in Canadian Patent Application 3,220,952 dated Feb. 6, 2025, pp. 1-4.

ETSI TR 103 611 V1.1.1 (Jun. 2020).

Performance Evaluation of Direct-Link Backhaul for UAV-aided Emergency Networks.

Green, "Non Terrestrial Networks and 5G ," Mpirical, Mar. 21, 2022, https://www.mpirical.com/blog/non-terrestrial-networks-and-5g.

300

350

400 ↘

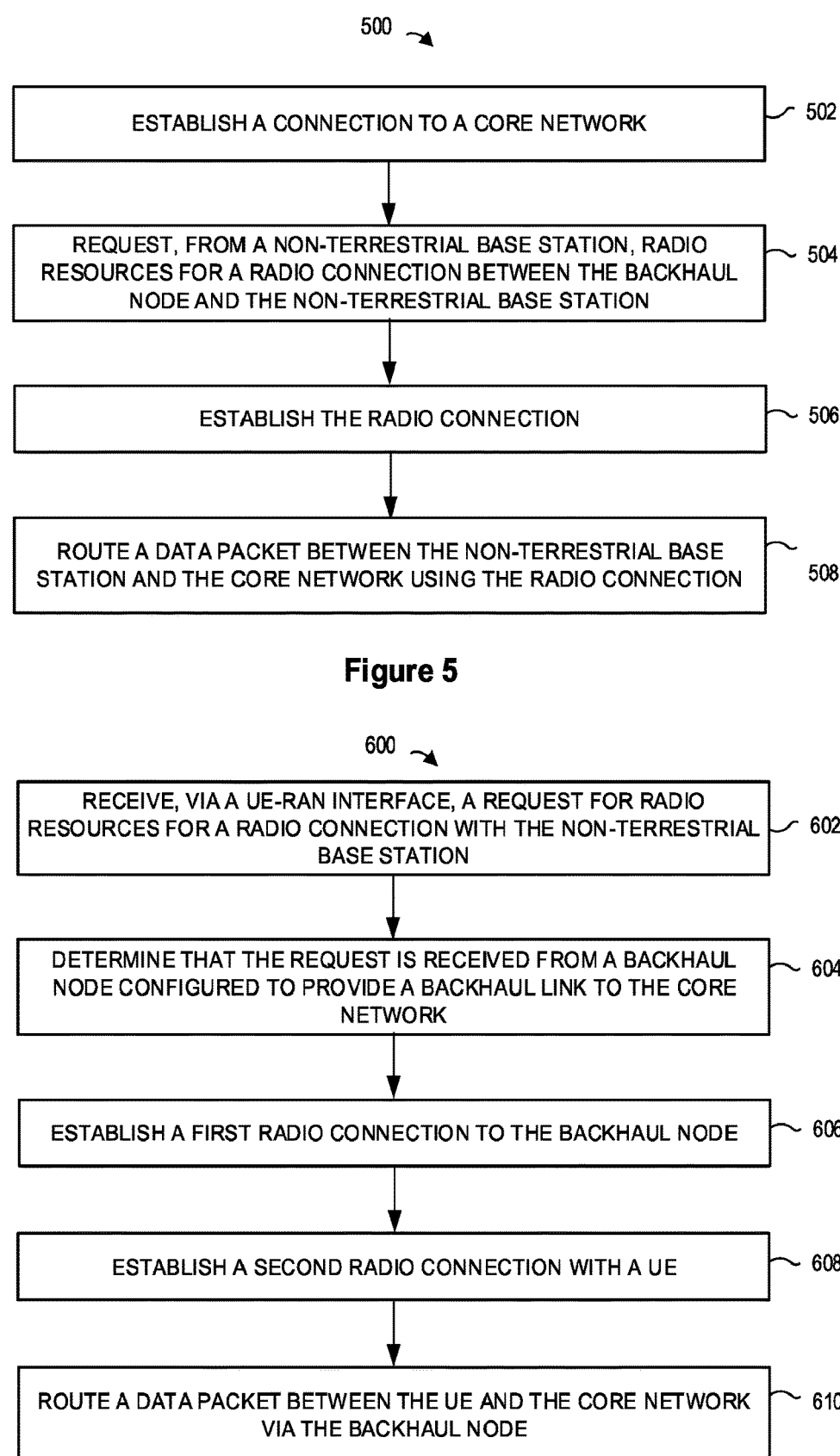

500 ⬋

| ESTABLISH A CONNECTION TO A CORE NETWORK | 502 |

↓

| REQUEST, FROM A NON-TERRESTRIAL BASE STATION, RADIO RESOURCES FOR A RADIO CONNECTION BETWEEN THE BACKHAUL NODE AND THE NON-TERRESTRIAL BASE STATION | 504 |

↓

| ESTABLISH THE RADIO CONNECTION | 506 |

↓

| ROUTE A DATA PACKET BETWEEN THE NON-TERRESTRIAL BASE STATION AND THE CORE NETWORK USING THE RADIO CONNECTION | 508 |

| RECEIVE, VIA A UE-RAN INTERFACE, A REQUEST FOR RADIO RESOURCES FOR A RADIO CONNECTION WITH THE NON-TERRESTRIAL BASE STATION | 602 |

↓

| DETERMINE THAT THE REQUEST IS RECEIVED FROM A BACKHAUL NODE CONFIGURED TO PROVIDE A BACKHAUL LINK TO THE CORE NETWORK | 604 |

↓

| ESTABLISH A FIRST RADIO CONNECTION TO THE BACKHAUL NODE | 606 |

↓

| ESTABLISH A SECOND RADIO CONNECTION WITH A UE | 608 |

↓

| ROUTE A DATA PACKET BETWEEN THE UE AND THE CORE NETWORK VIA THE BACKHAUL NODE | 610 |

Figure 6

BACKHAUL LINK FOR A HIGH ALTITUDE PLATFORM

CROSS-REFERENCE TO RELATED APPLICATIONS

This application is a U.S. National Phase Patent Application under 35 U.S.C. § 371 of International Application No. PCT/US2022/031586, filed May 31, 2022, entitled "BACKHAUL LINK FOR A HIGH ALTITUDE PLAT-FORM," which claims benefits of and priority to the U.S. Provisional Patent Application No. 63/195,467 filed Jun. 1, 2021, entitled "BACKHAUL LINK FOR A HIGH ALTI-TUDE PLATFORM," the entire contents of which are incorporated by reference.

FIELD OF THE DISCLOSURE

This disclosure relates generally to wireless communications and, more particularly, to managing a backhaul link for a high altitude platform.

BACKGROUND

This background description is provided for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In wireless communication networks, user devices (commonly referred to using the acronym "UE" for "user equipment") connect to a core network (CN) via base stations of a radio access network (RAN). The base stations can communicate with the core network using a backhaul network. To increase network coverage and traffic capacity, non-terrestrial base stations such as base stations implemented on high altitude platforms (HAPs) have been introduced. However, implementing such non-terrestrial base stations presents several technical challenges.

Existing backhaul networks for terrestrial base stations often rely on wired (e.g., fiber optic) links, which are incompatible for forming a direct link with a non-terrestrial base station. To communicate with a terrestrial base station in order to integrate with a RAN and rely upon existing backhaul links, the non-terrestrial base station must be equipped with radio equipment (e.g., antennas, transmitters, and receivers) configured to connect to such a terrestrial base station. This radio equipment may be different than the antennas, transmitters, and receivers that the non-terrestrial base station already must carry in order to communicate with UEs. Consequently, traditional backhaul link strategies may require non-terrestrial base stations to carry multiple sets of radio equipment with different capabilities, thus increasing the complexity, battery requirements, and weight of the non-terrestrial base station.

SUMMARY

Generally speaking, a network device of this disclosure provides connectivity between a core network and a non-terrestrial base station, which in turn provides network connectivity to user equipment units (UEs). The network device can be regarded as providing a backhaul link and accordingly can be referred to as a backhaul node. The backhaul node can be configured to operate similar to a UE relative to the non-terrestrial base station, e.g., utilize radio resources of the non-terrestrial base station similar to communication with a UE.

One example embodiment of these techniques is a method performed by a backhaul node for managing communications between a non-terrestrial base station and a core network. The method can be executed by processing hardware and includes: establishing a connection to the core network; requesting, from the non-terrestrial base station, radio resources for a radio connection between the backhaul node and the non-terrestrial base station; establishing the radio connection; and routing a data packet between the non-terrestrial base station and the core network using the radio connection.

Another example embodiment of these techniques is a backhaul node including processing hardware and configured to implement the method above.

A further example embodiment of these techniques is a method performed by a non-terrestrial base station for communicating with a core network. The method can be executed by processing hardware and includes: receiving, via a user equipment (UE)-radio access network (RAN) interface, a request for radio resources for a radio connection with the non-terrestrial base station; determining that the request is received from a backhaul node configured to provide a backhaul link to the core network; establishing a first radio connection with the backhaul node; establishing a second radio connection with a user equipment (UE); and routing a data packet between the UE and the core network via the backhaul node.

Yet another example embodiment of these techniques is a non-terrestrial base station including processing hardware and configured to implement the method above.

BRIEF DESCRIPTION OF THE DRAWINGS

FIG. 5 is a flow diagram of an example method for managing communications between a non-terrestrial base station and a core network, which can be implemented by a backhaul node; and FIG. 6 is a flow diagram of an example method for communicating with a core network via a backhaul node, which can be implemented by a non-terrestrial base station.

DETAILED DESCRIPTION OF THE DRAWINGS

Figure 1:
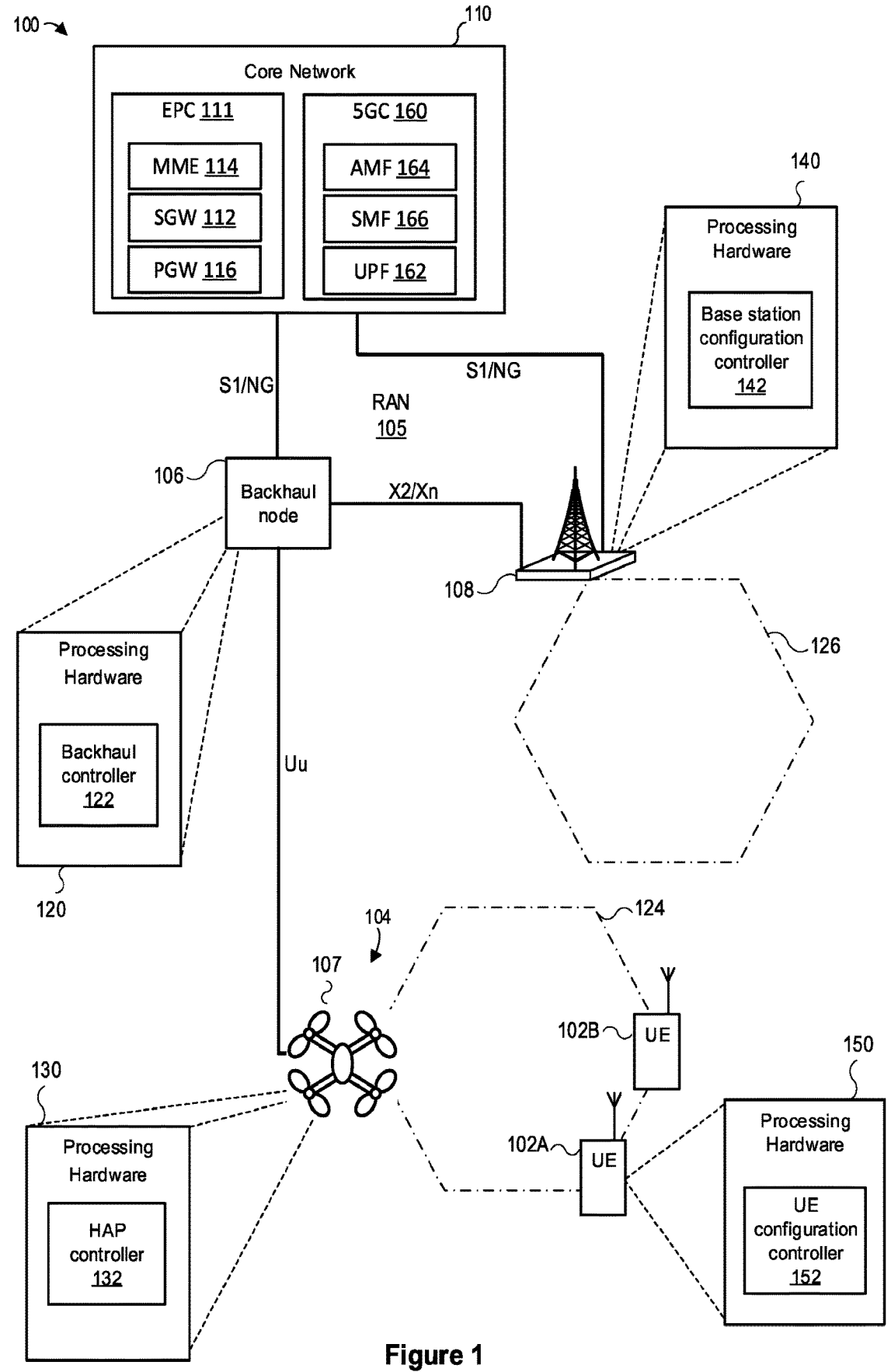
FIG. 1 is a block diagram of an example wireless communication system in which a backhaul node provides a backhaul link between a non-terrestrial base station and a core network, in accordance with the techniques of this disclosure.

A backhaul node implements techniques of this disclosure to provide a backhaul link between a non-terrestrial base station and a core network. To communicate with the non-terrestrial base station, the backhaul node can utilize the same air interface over which the non-terrestrial base station communicates with UEs (e.g., a Uu interface). Because the non-terrestrial base station can utilize the same frequencies and protocols to communicate with both a UE and the backhaul node, the non-terrestrial base station can operate one set of radio equipment to provide radio connections to both the UE and the backhaul node.

The backhaul node routes data between the non-terrestrial base station and the core network. For example, after receiving an uplink data packet from a UE, the non-terrestrial base station transmits the uplink data packet to the backhaul node, which in turn transmits the uplink data packet to the core network. Likewise, the backhaul node routes downlink data packets received from the core network, and addressed to UEs served by the non-terrestrial base station, to the non-terrestrial base station. Further, the backhaul node can also carry traffic between the non-terrestrial base station and another base station (e.g., similar to an Xn interface).

The backhaul node establishes a connection with the core network, via which the backhaul node provides an internet protocol (IP) connection between the core network and the non-terrestrial base station. In some implementations, the backhaul node has an internet connection directly to the core network. In other implementations, the backhaul node can establish a radio connection with a second base station (e.g., a terrestrial base station), and connect to the core network via the second base station.

In addition, the backhaul node establishes a radio connection with the non-terrestrial base station using similar mechanisms as a UE. For example, the backhaul node can initiate a contention-free random access procedure with the non-terrestrial base station to request a radio connection with the non-terrestrial base station. The non-terrestrial base station can broadcast (e.g., in a System Information Block (SIB)) resource configurations dedicated for use by backhaul nodes. Thus, the backhaul node can initiate the random access procedure by transmitting a random access preamble or on a Physical Random Access Channel (PRACH) occasion indicated by the broadcast. During the random access procedure, the backhaul node can transmit a radio resource control (RRC) connection request to the non-terrestrial base station, and identify itself as a backhaul node capable of providing a backhaul link to the core network. After identifying a node as a backhaul node, the non-terrestrial base station can assign a temporary identifier (e.g., a C-RNTI) allocated for backhaul nodes to the backhaul node.

Further, the non-terrestrial base station can schedule radio resources for the backhaul node in the same manner that the non-terrestrial base station schedules a UE. In particular, the non-terrestrial base station can transmit uplink and/or downlink resource configurations to the backhaul node that the backhaul node utilizes to communicate data with the non-terrestrial base station. The non-terrestrial base station can also schedule radio resources for both a UE and the backhaul node using dynamic time division duplexing (TDD), for example.

FIG. 1 is a block diagram of an example wireless communication system 100 in which a backhaul node provides a backhaul link between a non-terrestrial base station and a core network, in accordance with the techniques of this disclosure. The wireless communication system 100 includes a UE 102A, a UE 102B, a core network (CN) 110, a backhaul node 106, and a RAN 105, which includes a non-terrestrial base station (BS) 104 mounted on a suitable platform 107 and a terrestrial base station 108 (also referred to as a base station 108).

The backhaul node 106 can be any suitable computing device capable of wireless communication. The backhaul node 106 is equipped with processing hardware 120 that can include one or more general-purpose processors (e.g., CPUs) and a non-transitory computer-readable memory storing instructions executable on the one or more general-purpose processors, and/or special-purpose processing units. The processing hardware 120 in the example implementation of FIG. 1 includes a backhaul controller 122 that is configured to implement the techniques of this disclosure for managing communications between the non-terrestrial base station 104 and the CN 110.

The platform 107 of the non-terrestrial base station 104 can be an airborne vehicle, such as an unmanned aerial vehicle (UAV), high altitude platform (HAP), satellite, or balloon. While this disclosure primarily refers to the non-terrestrial base station 104 as a HAP 104 for simplicity, the non-terrestrial base station may be implemented on any suitable type of non-terrestrial vehicle. The HAP 104 is equipped with processing hardware 130 that can include one or more general-purpose processors (e.g., CPUs) and a non-transitory computer-readable memory storing instructions executable on the one or more general-purpose processors, and/or special-purpose processing units. The processing hardware 130 in the example implementation of FIG. 1 includes a HAP controller 132 that is configured to implement the techniques of this disclosure for managing communications with the CN 110 via the backhaul node 106.

The HAP 104 may communicate with a UE 102A and a UE 102B. The UE 102A is equipped with processing hardware 150 that can include one or more general-purpose processors (e.g., CPUs) and a non-transitory computer-readable memory storing instructions executable on the one or more general-purpose processors, and/or special-purpose processing units. The processing hardware 150 in the example implementation of FIG. 1 includes a UE configuration controller 152 that is configured to manage configurations with which the UE 102 is to communicate with the HAP 104 and/or the base station 108. The UE 102B may also include similar processing hardware (not shown). To case readability, UE 102 is used herein to represent either the UE 102A or the UE 102B, unless otherwise specified.

The base station 108 can be any suitable type of base station, such as an evolved node B (eNB), next-generation eNB (ng-eNB), a 5G node B (gNB), or a sixth generation (6G) node, for example. The base station 108 is equipped with processing hardware 140 that can include one or more general-purpose processors (e.g., CPUs) and a non-transitory computer-readable memory storing instructions executable on the one or more general-purpose processors, and/or special-purpose processing units. The processing hardware 140 in the example implementation of FIG. 1 includes a BS configuration controller 142 that is configured to manage configurations with which the base station 108 is to communicate with the HAP 104 and/or the UE 102.

Similar to the base station 108, the HAP 104 may also operate as an eNB, ng-eNB, gNB, or 6G node, except that the HAP 104 communicates with the CN 110 using a backhaul link provided by the backhaul node 106. The HAP 104 supports a cell 124, and the base station 108 provides a cell 126. The cells 124 and 126 can partially overlap, so that the UE 102 can select, reselect, or hand over from one or the cells 124 and 126 to the other. In general, the wireless communication system 100 can include any suitable number of terrestrial or non-terrestrial base stations supporting New Radio (NR) cells and/or Evolved Universal Terrestrial Radio Access (EUTRA) cells. Depending on the implementation, (i) a single backhaul node 106 may provide a backhaul link for a single HAP 104, or for multiple HAPs 104, and (ii) a HAP 104 may connect to a single backhaul node 106, or to multiple backhaul nodes 106.

The CN 110 can be implemented as an evolved packet core (EPC) 111 or a fifth generation (5G) core (5GC) 160, for example. The CN 110 can also be implemented as a 6G core, in another example. Among other components, the EPC 111 can include a Serving Gateway (SGW) 112, a Mobility Management Entity (MME) 114, and a Packet Data Network Gateway (PGW) 116. The SGW 112 in general is configured to transfer user-plane packets related to audio calls, video calls, Internet traffic, etc., and the MME 114 is configured to manage authentication, registration, paging, and other related functions. The PGW 116 provides connectivity from the UE 102 to one or more external packet data networks, e.g., an Internet network and/or an Internet Protocol (IP) Multimedia Subsystem (IMS) network. The 5GC 160 includes a User Plane Function (UPF) 162 and an Access and Mobility Management Function (AMF) 164, and/or Session Management Function (SMF) 166. Generally speaking, the UPF 162 is configured to transfer user-plane packets related to audio calls, video calls, Internet traffic, etc., the AMF 164 is configured to manage authentication, registration, paging, and other related functions, and the SMF 166 is configured to manage Protocol Data Unit (PDU) sessions.

The backhaul node 106 provides a backhaul link for the HAP 104. More particularly, the HAP 104 can communicate with the backhaul node 106 using an air interface generally used to connect a RAN and a UE (i.e., a RAN-UE interface), such as a Uu interface (e.g., an NR-Uu interface or an LTE-Uu interface). The HAP 104 can therefore communicate with both the UE 102 and the backhaul node 106 over the same type of air interface. To communicate with the UE 102 and the backhaul node 106, the HAP 104 can allocate downlink (DL) and/or uplink (UL) resources to each from the same pool of radio resources (e.g., time and/or frequency resources), as will be discussed in more detail with reference to FIG. 4. The backhaul node 106 also connects to the CN 110 to provide an NG interface for the HAP 104, and may connect to the base station 108 (or other base stations of the RAN 105) to provide an Xn interface for the HAP 104. Accordingly, the HAP 104 can communicate with the CN 110 and the base station 108 via the backhaul node 106. As an example, the HAP 104 can communicate with the base station 108 via the backhaul node 106 in order to perform mobility procedures (e.g., to hand over the UE 102 to the base station 108). In some implementations, the backhaul node 106 establishes a radio connection with the base station 108 over a Uu interface, and routes traffic between the base station 108 and the HAP 104 via that radio connection. Additionally or alternatively, the backhaul node 106 may route traffic between the base station 108 and the HAP 104 via the CN 110.

The mechanism by which the backhaul node 106 establishes a connection with the CN 110 can vary by implementation. In some implementations, the backhaul node 106 establishes a direct connection to the CN 110. For example, the backhaul node 106 can establish an internet connection (e.g., via a wireless local area network (WLAN) such as a WiFi® network, a local area network (LAN)), and establishes a connection to the CN 110 via the internet. In other implementations, the backhaul node 106 establishes a radio connection to a terrestrial base station (e.g., the base station 108), and establishes a connection with the CN 110 via the terrestrial base station. Further, the backhaul node 106 may be fixed or mobile. In one example, the backhaul node 106 is fixed, and connects to the CN 110 via the internet (e.g., via Ethernet). In another example, the backhaul node 106 is mobile, and connects to the CN 110 via a radio connection with a terrestrial base station.

Figure 2:
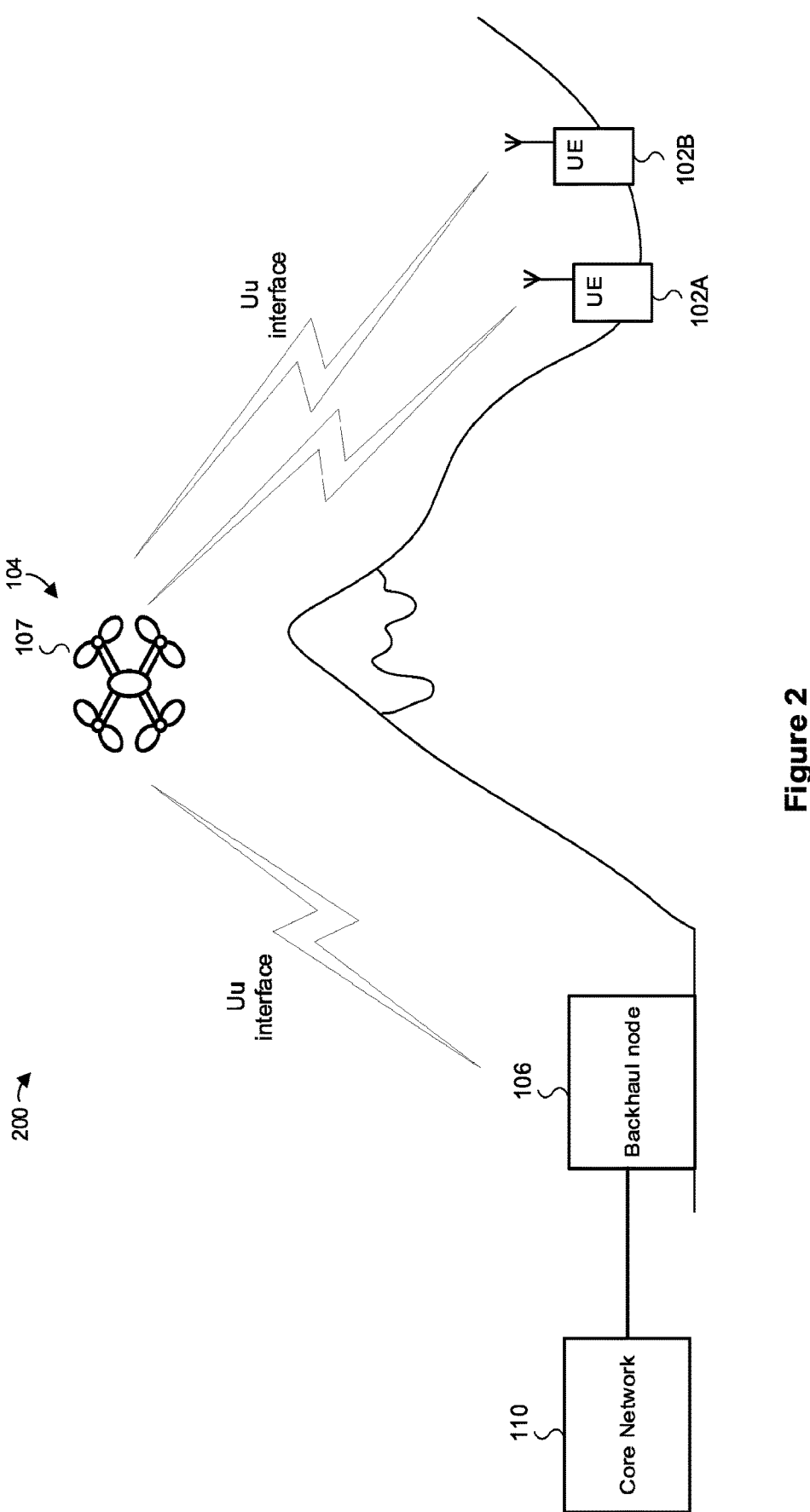
FIG. 2 illustrates an example environment in which a backhaul node provides a backhaul link for a non-terrestrial base station serving multiple UEs.

FIG. 2 illustrates an example environment 200 in which a backhaul node 106 provides a backhaul link for a HAP 104 serving UEs 102A and 102B. In an example scenario, the UEs 102A and 102B are located in a remote area where terrestrial base stations of the RAN 105 do not provide coverage or provide low-quality coverage. For example, the UEs 102A and 102B may be carried by hikers in a mountainous area. The HAP 104 may be deployed in order to provide coverage to such remote areas. The UEs 102A and 102B can request and establish a radio connection with the HAP 104 in the same manner as a traditional terrestrial base station (e.g., through a random access procedure) and communicate with the HAP 104 via the Uu interface.

In addition, the backhaul node 106 also requests and establishes a radio connection with the HAP 104, as will be discussed with reference to FIG. 4, and communicates with the HAP 104 via the Uu interface. The HAP 104 and the backhaul node 106 may each implement beamforming techniques in order to transmit/receive signals between each other. The backhaul node 106 also has a connection to the CN 110 (e.g., via the internet). The backhaul node 106 can therefore route data packets (e.g., addressed to the UE 102A or originating from the UE 102A) between the CN 110 and the HAP 104. In one example, the HAP 104 receives an UL data packet from the UE 102A and transmits the UL data packet to the backhaul node 106, which transmits the UL data packet to the CN 110. In another example, the backhaul node receives a DL data packet addressed to the UE 102A from the CN 110 and transmits the DL data packet to the HAP 104, which transmits the DL data packet to the UE 102A.

Depending on the implementation, the backhaul node 106 may be associated with the HAP 104 prior to requesting the radio connection with the HAP 104, and the HAP 104 may be configured to link with the particular backhaul node 106. For example, the same operator may deploy the backhaul node 106 and the HAP 104. In such a case, the HAP 104 and the backhaul node 106 may each store identifier(s) that allow each device to recognize the other. For example, the HAP 104 can a broadcast random access channel configuration for the backhaul node 106, and may include an identifier for the HAP 104 or backhaul node 106 in the broadcast. The backhaul node 106, based on detecting the identifier, can transmit a request for a radio connection to the HAP 104 using the random access channel configuration (e.g., by performing a contention-free random access procedure), and can include an identifier for the backhaul node 106 in the request. Based on the identifier, the HAP 104 can identify the backhaul node 106 as the particular backhaul node with which the HAP 104 is associated. In other implementations, the backhaul node 106 is not necessarily associated with the HAP 104 prior to requesting the radio connection with the HAP 104.

Depending on the implementation, the backhaul node 106 may be associated with multiple HAPs. As one example, the backhaul node 106 may be located at the edge of an area of network coverage (i.e., coverage provided by terrestrial base stations) and the backhaul node 106 may connected to multiple HAPs providing coverage outside of this area.

Further, a HAP 104 may be associated with multiple backhaul nodes. For example, each of the multiple backhaul nodes may be deployed by a different operator, and the HAP 104 may provide coverage for these multiple operators (e.g., via network slicing).

The HAP 104 can also support communications between the UE 102A and the UE 102B. For some communication types (e.g., Short Message Service (SMS) messages, IP Multimedia Subsystem (IMS) services), the HAP 104 routes communications between the UE 102A and the UE 102B to the CN 110 via the backhaul node 106. For other communication types (e.g., Over-the-top (OTT) or peer-to-peer applications), the HAP 104 can route communications between the UE 102A and the UE 102B without routing the communications to the backhaul node 106.

Figure 3A:
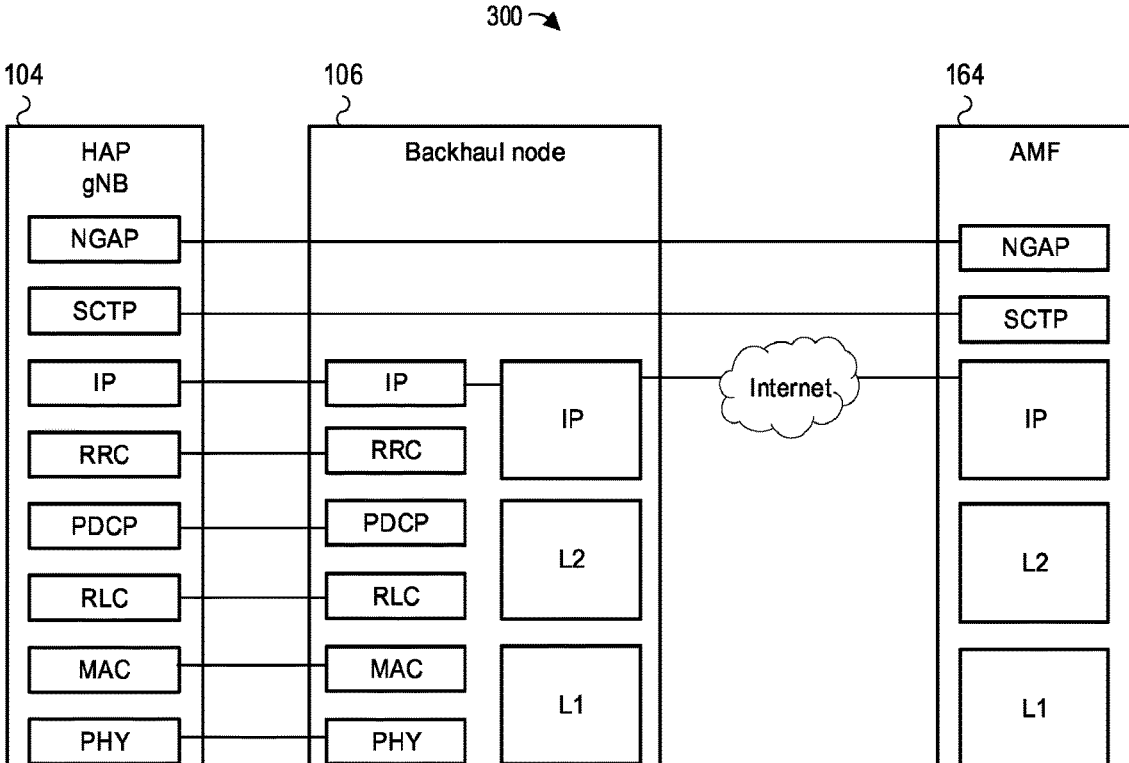
FIG. 3A is a block diagram of an example protocol stack according to which a non-terrestrial base station of FIGS. 1-2 communicates with a control plane of a core network via a backhaul node.
Figure 3B:
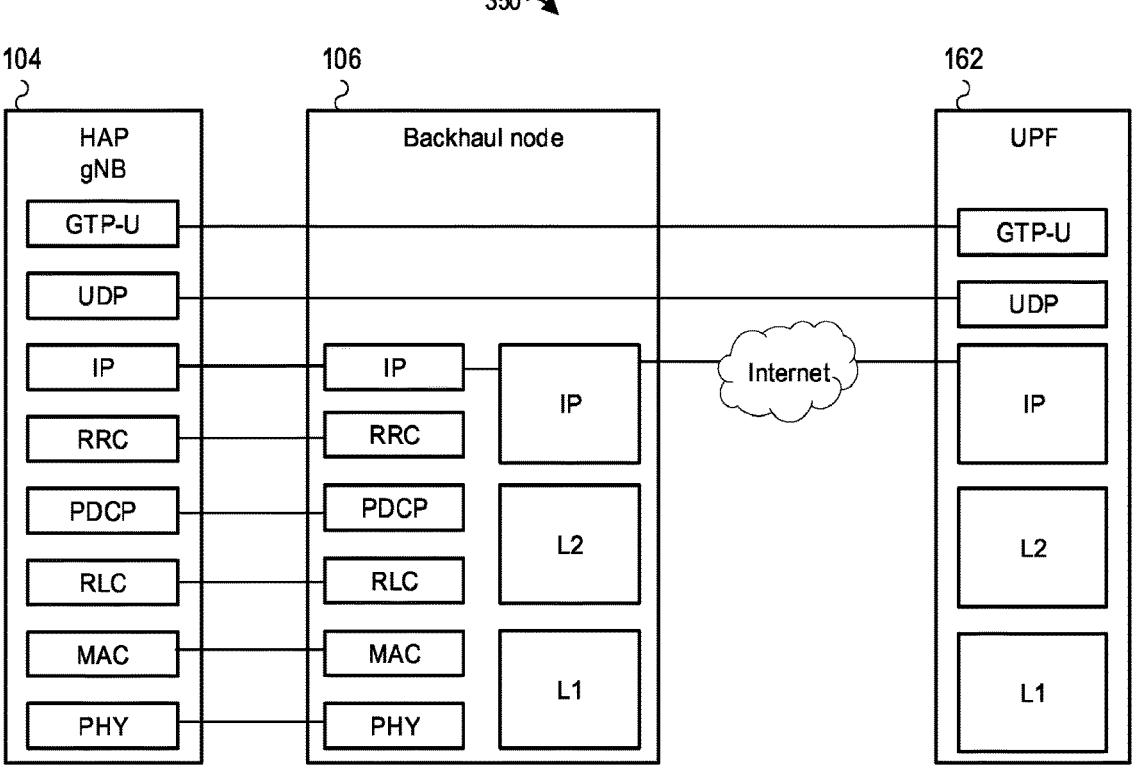
FIG. 3B is a block diagram of an example protocol stack according to which a non-terrestrial base station of FIGS. 1-2 communicates with a user plane of a core network via a backhaul node.

FIGS. 3A-3B illustrate an example control plane protocol stack 300 and an example user plane protocol stack 350, respectively, according to which the HAP 104 communicates with the CN 110 via the backhaul node 106. In FIGS. 3A-3B, the HAP 104 is implemented as a gNB, and the CN 110 is implemented as a 5GC. Accordingly, the control plane protocol stack 300 is for the NG control plane interface (NG-C) between the HAP 104 and the AMF 164 of the CN 110, and the user plane protocol stack 350 is for the NG user plane interface (NG-U) between the HAP 104 and the UPF 162 of the CN 110. For both protocol stacks 300 and 350, the backhaul node 106 provides a connection between the HAP 104 and the CN 110 at an IP layer (i.e., provides an IP connection between the HAP 104 and the CN 110). The backhaul node 106 routes signaling and data between the CN 110 and the HAP 104 using the IP connection. As described with reference to FIG. 1 and as shown in FIGS. 3A-3B, in some implementations, the backhaul node 106 establishes an IP connection with the CN 110 via the internet. In other implementations, the backhaul node 106 establishes a radio connection with another base station (e.g., the base station 108), and establishes an IP connection with the CN 110 via the radio connection with the other base station.

Functions at the transport layer (i.e., the Stream Control Transmission Protocol (SCTP) layer for the control plane protocol stack 300, the User Datagram Protocol (UDP) layer for the user plane protocol stack 350) are performed over the IP layer by the CN 110 and the HAP 104. In turn, functions at the application layer (i.e., the NG application protocol (NGAP) layer for the control plane protocol stack 300, the General Packet Radio Service (GPRS) Tunneling Protocol User Plane (GTP-U) for the user plane protocol stack 350) are performed over the transport layer. The backhaul node 106 is transparent to these transport and application layer functions.

Further, the CN 110 and the HAP 104 can apply security functions to their communications such that the backhaul node 106 serves as a router of information and cannot access the information. For example, the HAP 104 can establish a secure tunnel to the CN 110 via the backhaul node 106 (e.g., in accordance with a security protocol such as IPSec). Prior to transmitting information to the CN 110/HAP 104, the HAP 104/CN 110 can apply security functions to the information (e.g., encryption, integrity protection) to maintain the security of the information as it passes through the backhaul node 106.

Figure 4:
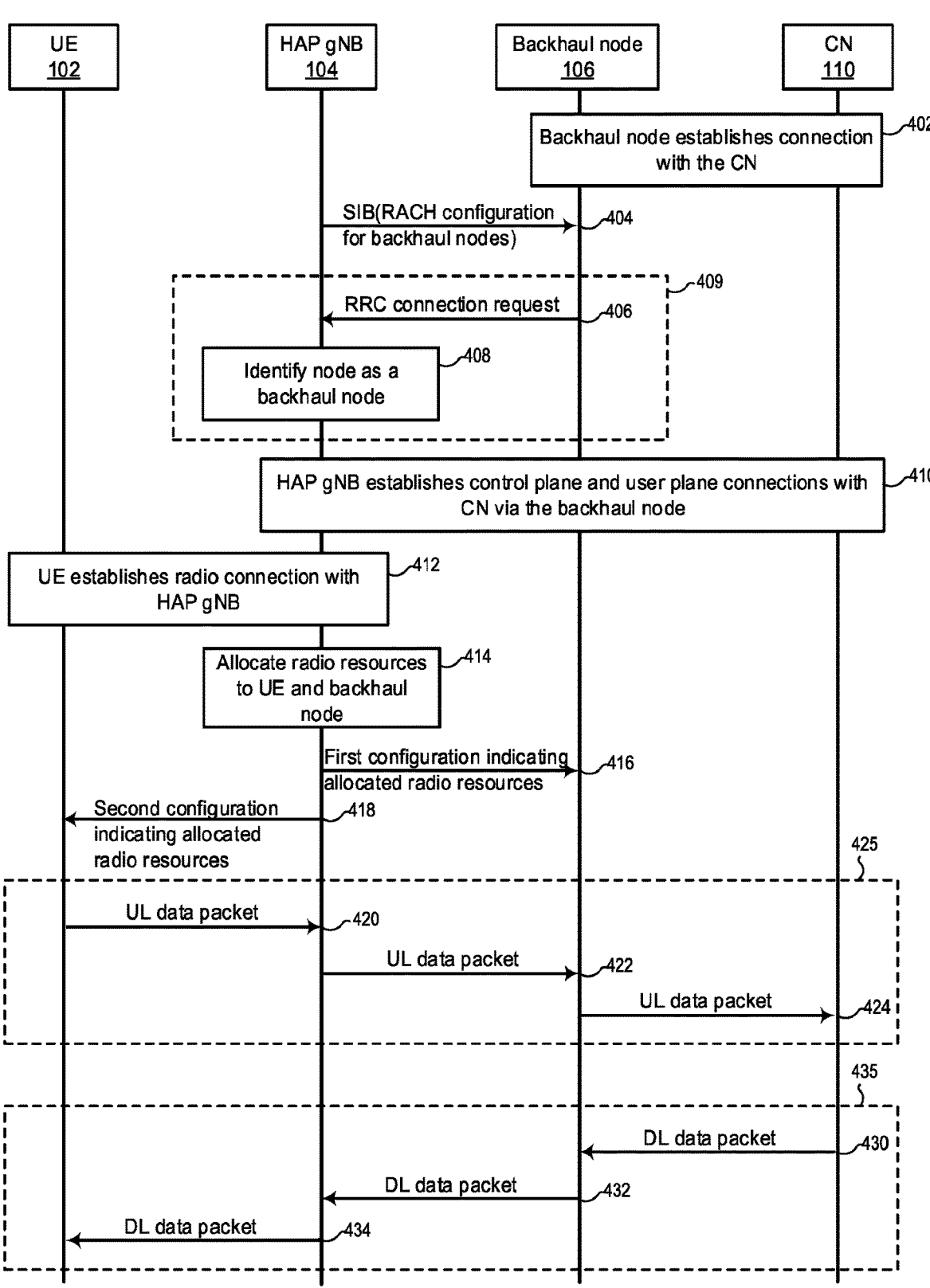
FIG. 4 is an example message sequence in which a non-terrestrial base station serving a UE communicates with a core network via a backhaul node.

Turning to FIG. 4, the backhaul node 106 provides a backhaul link for the HAP 104 during an example scenario 400. Initially, the backhaul node 106 establishes 402 a connection with the CN 110. The backhaul node 106 may establish 402 the connection with the CN 110 via the internet, or may establish 402 the connection with the CN 110 via an intermediate base station (i.e., a base station other than the HAP 104). In the latter case, the backhaul node 106 may first establish a radio connection with the base station, and then establish the connection with the CN 110 via the base station. To establish the radio connection with the base station, the backhaul node 106 can use techniques similar to those for a UE. For example, the backhaul node 106 can perform a random access procedure with the base station to request the radio connection from the base station. Further, in some implementations, the backhaul node 106 establishes 402 the connection with the CN via a physical connection (e.g., via a fiber optic link).

After establishing 402 the connection with the CN 110, the backhaul node 106 requests a radio connection with the HAP 104. The backhaul node 106 may request the radio connection by performing a random access procedure with the HAP 104. The random access procedure may be a contention-free random access procedure, for example. Initially, the HAP 104 broadcasts 404 one or more random access channel (e.g., Physical Random Access Channel (PRACH)) configuration(s). For example, the HAP 104 may broadcast 404 a random access channel configuration in a System Information Block (SIB). The random access channel configuration may be dedicated for use by backhaul nodes. For example, the random access channel configuration, or broadcast message including the random channel configuration, may include an indication, such as a flag or IE, that the random access channel configuration is for backhaul nodes and is not for use by UEs. Additionally or alternatively, the random access channel configuration or broadcast message may include an identity for the particular backhaul node 106 (e.g., in implementations in which the HAP 104 is configured to link with the particular backhaul node 106, as mentioned above) or for backhaul nodes generally. The random access channel configuration indicates random access channel resources (e.g., PRACH occasions and/or dedicated random access preambles) with which the backhaul node 106 can initiate a random access procedure. A PRACH occasion is an occasion on which the backhaul node 106 can transmit a random access preamble to initiate the random access procedure.

After receiving the random access channel configuration, the backhaul node 106 initiates 409 an RRC connection setup procedure by transmitting 406 a radio resource control (RRC) connection request (e.g., an RRC setup request message, such as an RRCSetupRequest message) to the HAP 104. The backhaul node 106 can transmit the RRC connection request to the HAP 104 during or after a random access procedure. For example, the backhaul node 106 can first transmit (a) a random access preamble on a PRACH occasion indicated in the broadcast from the HAP 104, or (b) a dedicated random access preamble indicated in the broadcast from the HAP 104, to the HAP 104 in order to initiate a random access procedure. Based on receiving the random access preamble on the PRACH occasion or receiving the dedicated random access preamble, the HAP 104 can identify 408 the node as a backhaul node (i.e., as a node configured to provide a backhaul link for the HAP 104 to the CN 110) during the RRC connection setup procedure 409. Additionally or alternatively, the HAP 104 can identify 408 the node as a backhaul node based on the RRC connection request that the HAP 104 receives 406. For example, the RRC connection request may include an indication, such as a flag or IE, that the requesting node is a backhaul node 106, or may include an identifier corresponding to a backhaul node.

The RRC connection setup procedure 409 can include a four-step or two-step random access procedure. In some implementations, the HAP 104 transmits a random access response (RAR) to the backhaul node 106 in response to the random access preamble. The RAR may indicate UL resources (e.g., on an UL channel such as the Physical Uplink Shared Channel (PUSCH)) on which the backhaul node 106 can transmit UL transmissions to the HAP 104. Further, the HAP 104 can also assign a temporary identifier (e.g., a cell radio network temporary identifier (C-RNTI) or a new type of RNTI for backhaul nodes) to the backhaul node 106 and include the temporary identifier in the RAR. The HAP 104 may select the temporary identifier from a pool of temporary identifiers reserved for backhaul nodes. After receiving the RAR, the backhaul node 106 can transmit 406 the RRC connection request to the HAP 104 using the UL resources indicated in the RAR. The backhaul node 106 may include the temporary identifier in the RRC connection request.

In some implementations, the backhaul node 106 transmits 406 the RRC connection request prior to receiving a RAR from the HAP 104. The backhaul node 106 transmits the random access preamble to the HAP 104 and transmits 406 a payload including an RRC connection request to the HAP 104. Transmitting the random access preamble and the payload can collectively be referred to as a "message A" of a two-step random access procedure, where the random access preamble and the payload are two parts of the message A that are sent at different occasions (a PRACH occasion and a PUSCH occasion, respectively). In response to the message A, the HAP 104 sends a RAR to the backhaul node 106 in a "message B." which may include a temporary identifier for the backhaul node 106, as discussed above.

In any event, after the HAP 104 receives 406 the RRC connection request, the HAP 104 can transmit an RRC connection message (e.g., an RRC setup message, such as an RRCSetup message) to the backhaul node 106, which in turn transmits an RRC connection complete message (e.g., an RRC setup complete message, such as an RRCSetupComplete message) to indicate establishment of the radio connection between the HAP 104 and the backhaul node 106. The RRC connection message may include configurations that the backhaul node 106 can utilize to communicate with the HAP 104 via the radio connection.

After establishing the radio connection with the backhaul node 106 via the RRC connection setup procedure 409, the HAP 104 can then establish 410 control plane and user plane connections (i.e., the connections illustrated by the protocol stacks 300, 350) with the CN 110 via the backhaul node 106. The backhaul node 106 serves as a gateway for the HAP 104 to the CN 110. Accordingly, the backhaul node 106 does not receive data (i.e., application-level user data) from the HAP 104 that is destined for the backhaul node 106 itself. As a result, the HAP 104 does not require a non-access stratum (NAS) context for the backhaul node 106. However, if the backhaul node 106 accesses the CN 110 via a terrestrial base station (e.g., the base station 108), the terrestrial base station may have a NAS context for the backhaul node 106 and perform mobility procedures with the backhaul node 106.

Further, the HAP 104 also establishes 412 a radio connection with the UE 102. The UE 102 may request a radio connection with the HAP 104 by performing a random access procedure with the HAP 104. During the random access procedure, the HAP 104 can assign a temporary identifier (e.g., a C-RNTI) to the UE 102. Accordingly, after the event 412, the HAP 104 has a first radio connection with the backhaul node 106 and a second radio connection with the UE 102. Both radio connections, as described with reference to FIGS. 1-2, utilize the same type of air interface (e.g., a Uu interface). While the scenario 400 includes a single UE 102, the HAP 104 may establish radio connections with multiple UEs. Likewise, the HAP 104 may also establish radio connections with multiple backhaul nodes.

The HAP 104 uses the second radio connection to receive UL data (from the perspective of the UE 102) from the UE 102, and uses the first radio connection to transmit the UL data to the CN 110 via the backhaul node 106. Further, the HAP 104 also uses the first radio connection to receive DL data (from the perspective of the UE 102) from the CN 110 via the backhaul node 106, and uses the second radio connection to transmit the DL data to the UE 102. In order to communicate with the UE 102 and the backhaul node 106, the HAP 104 allocates 414 radio resources (e.g., time and/or frequency and/or spatial resources) to each of the UE 102 and the backhaul node 106. Because the HAP 104 communicates with the UE 102 and the backhaul node 106 using the same air interface, the HAP 104 balances radio resources between the UE 102 and the backhaul node 106 (and any other UEs that the HAP 104 serves). The HAP 104 may allocate a first radio bearer to the backhaul node 106, and a second radio bearer to the UE 102. These radio bearers may have a one-to-one mapping, such that the second radio bearer between the UE 102 and the HAP 104 maps to the first radio bearer between the backhaul node 106 and the HAP 104. If the HAP 104 is serving multiple UEs, then the backhaul node 106 may use multiple radio bearers, each radio bearer corresponding to one of the multiple UEs.

The HAP 104 transmits 416 a first configuration to the backhaul node 106, where the first configuration indicates radio resources (e.g., UL and/or DL radio resources, where the UL direction in this non-UE-involved context is from the backhaul node 106 to the HAP 104) that the HAP 104 allocated 414 to the backhaul node 106. The HAP 104 may include the first configuration in a downlink control information (DCI), where the HAP 104 can scramble a cyclic redundancy check (CRC) for the DCI using the temporary identifier that the HAP 104 previously assigned to the backhaul node 106. Likewise, the HAP 104 also transmits 418 a second configuration to the UE 102, where the second configuration indicates radio resources (e.g., UL and/or DL radio resources, where the UL direction in this context is from the UE 102 to the HAP 104) that the HAP 104 allocated to the UE 102. The HAP 104 may include the second configuration in a DCI with a CRC scrambled using the temporary identifier that the HAP 104 previously assigned to the UE 102.

If the UE 102 has an UL data packet to transmit to the CN 110, the UE 102 uses the UL radio resources indicated in the second configuration to transmit 420 the UL data packet to the HAP 104, which in turn transmits 422 UL data packet to the backhaul node 106. The backhaul node 106 receives 422 the UL data packet from the HAP 104 using DL radio resources indicated in the first configuration. In this example, the data packet is referred to as an "UL" data packet because the UE 102 transmits 420 the UL data packet from the UE 102 to the HAP 104. From the perspective of the backhaul node 106, however, the backhaul node 106 uses DL radio resources to receive 422 the UL data packet from the HAP 104. After receiving 422 the UL data packet, the backhaul node 106 transmits 424 the UL data packet to the CN 110. The events 420, 422, and 424 are collectively referred to in this disclosure as an UL data routing procedure 425.

Similarly, if the CN 110 has a DL data packet to transmit to the UE 102, the CN 110 transmits 430 the DL data packet to the backhaul node 106, which in turn transmits 432 the DL data packet to the HAP 104 using the UL radio resources indicated in the first configuration. The HAP 104 then transmits 434 the DL data packet to the UE 102, which the UE 102 can receive using the DL radio resources indicated in the second configuration. In this example, the data packet is referred to as a "DL" data packet because the HAP 104 transmits 434 the DL data packet to the UE 102. From the perspective of the backhaul node 106, the backhaul node 106 uses UL radio resources to transmit 432 the DL data packet to the HAP 104. The events 430, 432, and 434 are collectively referred to in this disclosure as a DL data routing procedure 435.

The HAP 104 can dynamically schedule transmissions to/from the UE 102 and the backhaul node 106, depending on traffic. The UE 102 can inform the HAP 104 of available UL data at the UE 102 by transmitting a buffer status report (BSR) to the HAP 104. Similarly, the backhaul node 106 can also provide a BSR to the HAP 104 indicating available UL data that the backhaul node 106 has received from the CN 110 or other base stations. To provide updated scheduling information to the UE 102 and the backhaul node 106, the HAP 104 can transmit DCIs including updated configurations (e.g., full configurations or delta configurations augmenting earlier-transmitted configurations) to the UE 102 and the backhaul node 106, where CRCs of the DCIs are scrambled using the corresponding temporary identifier for either the UE 102 or the backhaul node 106. In some implementations, the HAP 104 performs dynamic time division duplexing (TDD) in order to balance radio resources between the UE 102 and the backhaul node 106. For example, the HAP 104 can schedule a full UL transmission from the backhaul node 106 to the HAP 104, followed by a full DL transmission from the HAP 104 to the UE 102. As another example, the HAP 104 can schedule a full UL transmission from the UE 102 to the HAP 104, followed by a full DL transmission from the HAP 104 to the backhaul node 106. In another example, the HAP 104 allocate radio resources to the backhaul node 106 and the UE 102 on the same DL or UL slot.

In some implementations, the HAP 104 performs frequency division duplexing (FDD) to balance radio resources between the UE 102 and the backhaul node 106. For example, the HAP 104 can allocate a DL or UL subcarrier frequency for exclusive use by the backhaul node 106, or can allocate a DL or UL subcarrier frequency for mixed use by the backhaul node 106 and the UE 102.

Further, as mentioned with reference to FIGS. 3A-3B, prior to the UL and DL data routing procedures 425, 435, the HAP 104 can establish a secure tunnel to the CN 110 through the backhaul node 106, the HAP 104 can use the secure tunnel to exchange data with the CN 110 via the backhaul node 106.

Referring next to FIG. 5, a backhaul node (e.g., the backhaul node 106) can implement an example method 500 to manage communications between a non-terrestrial base station (e.g., the HAP 104) and a CN (e.g., the CN 110).

At block 502, the backhaul node establishes a connection to the CN (e.g., event 402). In one example, the backhaul node establishes the connection with the CN via the internet. In another example, the backhaul node establishes a radio connection with a second base station, and establishes the connection with the core network via the second base station.

At block 504, the backhaul node requests, from the non-terrestrial base station, radio resources for a radio connection between the backhaul node and the non-terrestrial base station (e.g., event 406). The backhaul node can request the radio resources via a UE-RAN interface, such as a Uu interface. To request the radio resources, the backhaul node may perform a random access procedure with the non-terrestrial base station, which may include transmitting, to the non-terrestrial base station, a request to establish the radio connection (e.g., an RRC connection request). Further, in the request or during the random access procedure, the backhaul node may provide an indication to the non-terrestrial base station that the backhaul node operates as a backhaul link to the CN (e.g., by providing an identifier associated with backhaul nodes, or by using a dedicated random access preamble or PRACH occasion reserved for backhaul nodes to initiate the random access procedure). To initiate the random access procedure, the backhaul node may use a random access channel configuration (e.g., indicating a random access preamble or indicating an occasion on a random access channel, such as the PRACH) received from the non-terrestrial base station. During the random access procedure, the backhaul node may receive a temporary identifier (e.g., a C-RNTI or a new type of RNTI for backhaul nodes) from the non-terrestrial base station, which the backhaul node can use to communicate with the non-terrestrial base station (e.g., to descramble a CRC of a DCI indicating scheduled radio resources for the backhaul node).

At block 506, the backhaul node establishes the radio connection with the non-terrestrial base station. For example, the backhaul node may receive a response to the request for radio resources from the non-terrestrial base station (e.g., an RRC connection message), and transmit a message (e.g., an RRC connection complete message) indicating establishment of the radio connection.

At block 508, the backhaul node routes a data packet between the non-terrestrial base station and the core network using the radio connection (e.g., events 422-424, 430-434). For example, the backhaul node may receive the data packet from the CN, and transmit the data packet to the non-terrestrial base station via the radio connection. As another example, the backhaul node may receive the data packet from the non-terrestrial base station via the radio connection, and transmit the data packet to the CN. To transmit/receive data packets to/from the non-terrestrial base station, the backhaul node can use uplink/downlink resources allocated to the backhaul node by the non-terrestrial base station. The non-terrestrial base station can transmit, to the backhaul node, configurations indicating the uplink/downlink resources allocated to the backhaul node.

The backhaul node provides an IP connection between the non-terrestrial base station and the CN, and routes the data packet using the IP connection. Further, the backhaul node can also transmit traffic (i.e., Xn traffic) between the non-terrestrial base station and a terrestrial base station or a second non-terrestrial base station.

Turning to FIG. 6, a non-terrestrial base station (e.g., the HAP 104) can implement an example method 600 to communicate with a CN (e.g., the CN 110) via a backhaul node (e.g., the backhaul node 106).

At block 602, the non-terrestrial base station receives, via a UE-RAN interface, a request for radio resources for a radio connection with the non-terrestrial base station (e.g., event 406). The non-terrestrial base station may receive the request via a Uu interface. Further, the non-terrestrial base station may receive the request on a frequency within a frequency band reserved for communicating with UEs (e.g., on the same air interface resources used by the non-terrestrial base station to communicate with UEs). The non-terrestrial base station may receive the request during a random access procedure with the backhaul node. In particular, the non-terrestrial base station may broadcast an indication of a random access channel configuration, and performing the random access procedure may include receiving a random access preamble from the backhaul node in accordance with the random access channel configuration. The random access channel configuration may be dedicated for use by backhaul nodes (i.e., include PRACH occasions and/or random access preambles dedicated for use by backhaul nodes). During the random access procedure, the non-terrestrial base station may transmit a temporary identifier to the backhaul node, where the temporary identifier may be allocated for backhaul nodes.

At block 604, the non-terrestrial base station determines that the request is received from a backhaul node configured to provide a backhaul link to the CN (e.g., event 408). At block 606, the non-terrestrial base station establishes a first radio connection with the backhaul node in response to receiving the request for radio resources. At block 608, the non-terrestrial base station establishes a second radio connection with a UE (e.g., the UE 102) (e.g. event 412).

At block 610, the non-terrestrial base station routes a data packet between the UE and the CN via the backhaul node (e.g., event 425, 435). Routing the data packet may include using an IP connection between the non-terrestrial base station and the CN through the backhaul node. Further, the non-terrestrial base station may establish a secure tunnel to the CN through the backhaul node and communicate the data packet with the CN using the secure tunnel.

As one example, the non-terrestrial base station can receive a data packet from the UE via the second radio connection and transmit the data packet to the CN via the backhaul node using the first radio connection. As another example, the non-terrestrial base station can receive a data packet from the CU via the backhaul node using first radio connection and transmit the data packet to the UE using the second radio connection. To support communicating with the backhaul node, the non-terrestrial base station can allocate uplink/downlink resources to the backhaul node and transmit configuration(s) indicating the downlink/uplink resources to the backhaul node. The non-terrestrial base station can schedule radio resources for the UE and the backhaul using dynamic time division duplexing or frequency division duplexing.

In some implementations, the non-terrestrial base station also communicates data between the UE and a second UE served by the non-terrestrial base station without routing the data to the backhaul node (e.g., for OTT or peer-to-peer applications). Further, the non-terrestrial base station may communicate data for multiple UEs with the CN via the backhaul node. The non-terrestrial base station can also communicate with other base stations (terrestrial base stations or other non-terrestrial base stations) via the backhaul node. Additionally or alternatively, the non-terrestrial base station can directly communicate with other non-terrestrial base stations without routing information via the backhaul node.

The following list of examples reflects a variety of the embodiments explicitly contemplated by the present disclosure:

Example 1. A method performed by a backhaul node for managing communications between a non-terrestrial base station and a core network, the method comprising: establishing, by processing hardware of the backhaul node, a connection to the core network; requesting, by the processing hardware from the non-terrestrial base station, radio resources for a radio connection between the backhaul node and the non-terrestrial base station; establishing, by the processing hardware, the radio connection; and routing, by the processing hardware, a data packet between the non-terrestrial base station and the core network using the radio connection.

Example 2. The method of example 1, wherein requesting the radio resources includes: requesting the radio resources via a user equipment (UE)-radio access network (RAN) interface.

Example 3. The method of example 2, wherein requesting the radio resources includes: requesting the radio resources via a Uu interface.

Example 4. The method of any one of the preceding examples, wherein requesting the radio resources includes: providing, to the non-terrestrial base station, an indication that the backhaul node operates as a backhaul link to the core network.

Example 5. The method of any one of the preceding examples, wherein requesting the radio resources includes: performing a random access procedure with the non-terrestrial base station, including: transmitting, to the non-terrestrial base station, a request to establish the radio connection.

Example 6. The method of example 5, further comprising: receiving, by the processing hardware from the non-terrestrial base station, a random access channel configuration; wherein performing the random access procedure includes: initiating the random access procedure using the random access channel configuration.

Example 7. The method of example 6, wherein: the random access channel configuration indicates a random access preamble; and initiating the random access procedure includes transmitting the random access preamble to the non-terrestrial base station on a random access channel.

Example 8. The method of example 6 or example 7, wherein: the random access channel configuration indicates an occasion on a random access channel; and initiating the random access procedure includes transmitting a random access preamble on the occasion.

Example 9. The method of any one of the preceding examples, wherein establishing the radio connection includes: receiving, from the non-terrestrial base station, a temporary identifier for the backhaul node.

Example 10. The method of any one of the preceding examples, wherein establishing the connection to the core network includes: establishing the connection with the core network via the internet.

Example 11. The method of any one of examples 1-9, wherein: the radio connection is a first radio connection; and establishing the connection to the core network includes: establishing a second radio connection with a second base station; and establishing the connection with the core network via the second base station.

Example 12. The method of any one of the preceding examples, wherein routing the data packet includes: receiving the data packet from the core network; and transmitting the data packet to the non-terrestrial base station via the radio connection.

Example 13. The method of example 12, further comprising: receiving, by the processing hardware from the non-terrestrial base station, an indication of uplink resources allocated to the backhaul node; wherein the backhaul node transmits the data packet to the non-terrestrial base station using the uplink resources.

Example 14. The method of any one of examples 1-11, wherein routing the data packet includes: receiving the data packet from the non-terrestrial base station via the radio connection; and transmitting the data packet to the core network.

Example 15. The method of example 14, further comprising: receiving, by the processing hardware from the non-terrestrial base station, an indication of downlink resources allocated to the backhaul node; wherein the backhaul node receives the data packet from the non-terrestrial base station using the downlink resources.

Example 16. The method of any one of the preceding examples, wherein routing the data packet includes: providing an internet protocol (IP) connection between the non-terrestrial base station and the core network; and routing the data packet using the IP connection.

Example 17. The method of any one of the preceding examples, further comprising: routing, by the processing hardware, data between the non-terrestrial base station and a terrestrial base station.

Example 18. The method of any one of the preceding examples, wherein the non-terrestrial base station is a first non-terrestrial base station, the method further comprising: routing, by the processing hardware, data between the first non-terrestrial base station and a second non-terrestrial base station.

Example 19. A backhaul node including processing hardware and configured to implement a method according to any one of examples 1-18.

Example 20. A method performed by a non-terrestrial base station for communicating with a core network, the method comprising: receiving, by processing hardware via a user equipment (UE)-radio access network (RAN) interface, a request for radio resources for a radio connection with the non-terrestrial base station; determining, by the processing hardware, that the request is received from a backhaul node configured to provide a backhaul link to the core network; establishing, by the processing hardware, a first radio connection with the backhaul node; establishing, by the processing hardware, a second radio connection with a user equipment (UE); and routing, by the processing hardware, a data packet between the UE and the core network via the backhaul node.

Example 21. The method of example 20, wherein receiving the request includes: receiving the request via a Uu interface.

Example 22. The method of example 20 or 21, wherein receiving the request includes: receiving the request on a frequency within a frequency band reserved for communicating with UEs.

Example 23. The method of any one of examples 20-22, wherein receiving the request includes: performing a random access procedure with the backhaul node; and receiving the request during the random access procedure.

Example 24. The method of example 23, further comprising: broadcasting an indication of a random access channel configuration; wherein performing the random access procedure includes receiving a random access preamble in accordance with the configuration.

Example 25. The method of example 24, wherein the random access channel configuration is dedicated for use by backhaul nodes.

Example 26. The method of any one of examples 20-25, further comprising: transmitting, by the processing hardware to the backhaul node, a temporary identifier allocated for backhaul nodes.

Example 27. The method of any one of examples 20-26, wherein routing the data packet includes: routing the data packet using an internet protocol (IP) connection between the non-terrestrial base station and the core network through the backhaul node.

Example 28. The method of any one of examples 20-27, wherein routing the data packet further includes: establishing a secure tunnel to the core network through the backhaul node; and communicating the data packet with the core network using the secure tunnel.

Example 29. The method of any one of examples 20-28, wherein routing the data packet includes: receiving the data packet from the UE; and transmitting the data packet to the core network via the backhaul node.

Example 30. The method of example 29, further comprising: allocating, by the processing hardware, downlink radio resources to the backhaul node; and transmitting, by the processing hardware to the backhaul node, a downlink configuration indicating the allocated downlink radio resources; wherein transmitting the data packet includes: transmitting the data packet to the backhaul node in accordance with the downlink configuration.

Example 31. The method of any one of examples 20-28, wherein routing the data packet includes: receiving the data packet from the core network via the backhaul node; and transmitting the data packet to the UE.

Example 32. The method of example 31, further comprising: allocating, by the processing hardware, uplink radio resources to the backhaul node; and transmitting, by the processing hardware to the backhaul node, an uplink configuration indicating the allocated uplink radio resources; wherein receiving the data packet includes: receiving the data packet from the backhaul node in accordance with the uplink configuration.

Example 33. The method of any one of examples 20-32, further comprising: scheduling, by the processing hardware, resources for the UE and the backhaul node using dynamic time division duplexing.

Example 34. The method of any one of examples 20-33, wherein the UE is a first UE, the method further comprising: routing, by the processing hardware, data between the UE and a second UE without routing the data to the backhaul node.

Example 35. The method of any one of examples 20-33, wherein the UE is a first UE and the data packet is a first data packet, the method further comprising: routing, by the processing hardware, a second data packet between a second UE and the core network via the backhaul node.

Example 36. The method of any one of examples 20-35, further comprising: communicating, by the processing hardware, with a second base station via the backhaul node.

Example 37. A non-terrestrial base station including processing hardware and configured to implement a method according to any one of examples 20-36.

The following additional considerations apply to the foregoing discussion.

A user device in which the techniques of this disclosure can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Certain embodiments are described in this disclosure as including logic or a number of components or modules. Modules may can be software modules (e.g., code stored on non-transitory machine-readable medium) or hardware modules. A hardware module is a tangible unit capable of performing certain operations and may be configured or arranged in a certain manner. A hardware module can comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

What is claimed is:

1. A method performed by a backhaul node for managing communications between a non-terrestrial base station and a core network, the method comprising:

establishing, by the backhaul node, a connection to the core network;

requesting, by the backhaul node from the non-terrestrial base station, radio resources for a user equipment (UE)-radio access network (RAN) interface radio connection between the backhaul node and the non-terrestrial base station;

establishing, by the backhaul node, the UE-RAN interface radio connection; and routing, by the backhaul node, a data packet between the non-terrestrial base station and the core network using the UE-RAN interface radio connection.

2. The method of claim 1, wherein requesting the radio resources includes:

transmitting a connection request to the non-terrestrial base station for the radio resources, wherein the connection request allows the non-terrestrial base station to identify the backhaul node.

3. The method of claim 1, wherein requesting the radio resources is performed via a Uu interface.

4. The method of claim 1, wherein requesting the radio resources includes:

providing, to the non-terrestrial base station, an indication that the backhaul node operates as a backhaul link to the core network.

5. The method of claim 1, wherein requesting the radio resources includes:

performing a random access procedure with the non-terrestrial base station, including:

transmitting, to the non-terrestrial base station, a request to establish the UE-RAN interface radio connection.

6. The method of claim 1, wherein routing the data packet includes at least one of:

(i) receiving the data packet from the core network, and transmitting the data packet to the non-terrestrial base station via the UE-RAN interface radio connection; or (ii) receiving the data packet from the non-terrestrial base station via the UE-RAN interface radio connection, and transmitting the data packet to the core network.

7. The method of claim 1, further comprising:

receiving, by the backhaul node from the non-terrestrial base station, an indication of uplink resources or downlink resources allocated to the backhaul node;

wherein the backhaul node routes the data packet between the non-terrestrial base station and the core network using the uplink resources or the downlink resources.

8. A backhaul node comprising processing hardware and configured to:

establish, by the backhaul node, a connection to a core network for managing communications between a non-terrestrial base station and the core network;

request, by the backhaul node from the non-terrestrial base station, radio resources for a user equipment (UE)-radio access network (RAN) interface radio connection between the backhaul node and the non-terrestrial base station;

establish, by the backhaul node, the UE-RAN interface radio connection; and route, by the backhaul node, a data packet between the non-terrestrial base station and the core network using the UE-RAN interface radio connection.

9. A method performed by a non-terrestrial base station for communicating with a core network, the method comprising:

receiving, by the non-terrestrial base station via a user equipment (UE)-radio access network (RAN) interface, a request for radio resources for a radio connection with the non-terrestrial base station;

determining, by the non-terrestrial base station, that the request is received from a backhaul node configured to provide a backhaul link to the core network;

establishing, by the non-terrestrial base station, a first radio connection with the backhaul node;

establishing, by the non-terrestrial base station, a second radio connection with a user equipment (UE); and routing, by the non-terrestrial base station, a data packet between the UE and the core network via the backhaul node.

10. The method of claim 9, wherein receiving the request includes:

performing a random access procedure with the backhaul node; and receiving the request during the random access procedure.

11. The method of claim 10, further comprising:

broadcasting an indication of a random access channel configuration dedicated for use by backhaul nodes;

wherein performing the random access procedure includes receiving a random access preamble in accordance with the configuration.

12. The method of claim 9, further comprising:

transmitting, by the non-terrestrial base station to the backhaul node, a temporary identifier allocated for backhaul nodes.

13. The method of claim 9, wherein routing the data packet further includes:

establishing a secure tunnel to the core network through the backhaul node; and communicating the data packet with the core network using the secure tunnel.

14. The method of claim 9, further comprising:

allocating, by the non-terrestrial base station, downlink radio resources or uplink radio resources to the backhaul node; and transmitting, by the non-terrestrial base station to the backhaul node, a configuration indicating the allocated downlink radio resources or the allocated uplink radio resources;

wherein routing the data packet includes:

routing the data packet to or from the backhaul node in accordance with the configuration.

15. The method of claim 9, wherein the first radio connection with the backhaul node includes a UE-RAN interface radio connection.

16. The method of claim 9, wherein the UE is a first UE and the data packet is a first data packet, the method further comprising at least one of:

routing, by the non-terrestrial base station, data between the UE and a second UE without routing the data to the backhaul node; or, routing, by the non-terrestrial base station, a second data packet between a second UE and the core network via the backhaul node.

17. The method of claim 1, wherein the non-terrestrial base station comprises a next generation Node B (gNB) and wherein the requesting comprises receiving system information blocks (SIBs) from the non-terrestrial base station.

18. The backhaul node of claim 8, wherein the non-terrestrial base station comprises a next generation Node B (gNB) and wherein the backhaul node receives system information blocks (SIBs) from the non-terrestrial base station.

19. The method of claim 9, wherein the non-terrestrial base station comprises a next generation Node B (gNB) and the method further comprises transmitting system information blocks (SIBs) to the backhaul node.

20. The backhaul node of claim 8, further configured to:

transmit a connection request to the non-terrestrial base station for the radio resources, wherein the connection request allows the non-terrestrial base station to identify the backhaul node.

* * * * *